United States Patent [19]
Meyer

[11] 3,955,439
[45] May 11, 1976

[54] POSITIONING DEVICE FOR ADJUSTABLE STEERING COLUMN

[75] Inventor: Lawrence L. Meyer, Northville, Mich.

[73] Assignee: Eaton Corporation, Cleveland, Ohio

[22] Filed: Sept. 30, 1974

[21] Appl. No.: 510,514

[52] U.S. Cl.................................. 74/493; 74/495; 403/104; 280/87 A
[51] Int. Cl.² ........................................ B62D 1/18
[58] Field of Search.................... 74/495, 493, 491; 403/104; 280/87.3

[56] References Cited
UNITED STATES PATENTS

| 2,185,779 | 1/1940 | Treidt | 74/493 |
| 2,226,656 | 12/1940 | Best | 74/493 |
| 2,770,981 | 11/1956 | Fieber | 74/493 |
| 3,380,101 | 5/1971 | Jorgensen | 74/493 |
| 3,492,702 | 2/1970 | Stafford | 403/104 |
| 3,604,734 | 9/1971 | Friedman | 403/104 |
| 3,678,778 | 7/1972 | Groves | 74/493 |

Primary Examiner—Samuel Scott
Assistant Examiner—Randall Heald
Attorney, Agent, or Firm—Teagno & Toddy

[57] ABSTRACT

A positioning device for motor vehicle adjustable steering columns which includes antifriction strips disposed between slideably engaged inner and outer sleeve members and a locking cam member to allow locking at infinitely variable axial positions of the sleeve members.

4 Claims, 5 Drawing Figures

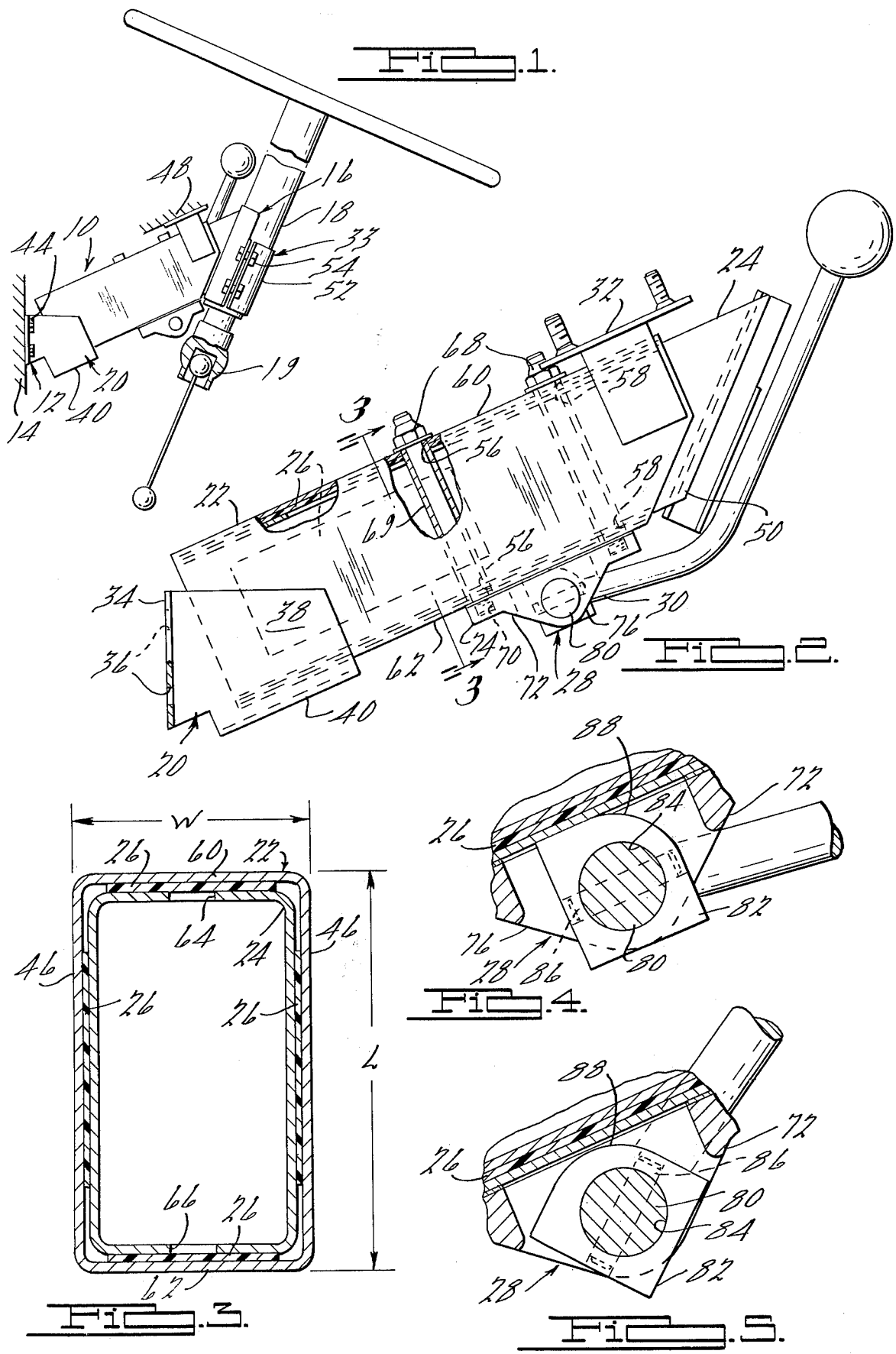

POSITIONING DEVICE FOR ADJUSTABLE STEERING COLUMN

BACKGROUND OF THE INVENTION

1. Field of the Invention

This invention relates to adjustable steering columns in general and in particular to positioning devices for adjustable steering columns mounted to be movable in only one axis.

2. Description of the Prior Art

Previous positioning devices for adjustable steering columns have had two major defects. They have either been adjustable in steps from one discrete position to another or they have been extremely expensive to manufacture if infinitely variable positioning has been achieved.

In the former case a variety of ratchet and locking pin devices have been employed. In the latter complicated and expensive screw type locking mechanisms have been used. These two major defects as well as others are overcome in the positioning device of the present invention.

SUMMARY OF THE INVENTION

It is an object of this invention to provide a positioning device for steering columns adjustably positionable along one axis that economically allows infinitely variable positioning.

This object is accomplished in the present invention by the provision of a telescoping positioning device in which antifriction means are disposed between the telescoping members and locking means are provided which operate to apply a force in a direction normal to the telescoping axis to force the telescoping members together and compress the antifriction means therebetween.

BRIEF DESCRIPTION OF THE DRAWINGS

These and other objects and advantages will become apparent to those skilled in the art upon reference to the accompanying specification and drawings wherein:

FIG. 1 is a side elevational view of the invention positioning device installed with a steering column;

FIG. 2 is a side elevational view of the invention positioning device;

FIG. 3 is a sectional view of the positioning device taken along line 3—3 of FIG. 2;

FIG. 4 is a partial sectional view of the positioning device showing the locking means in the locked position; and FIG. 5 is a partial sectional view similar to FIG. 4 showing the locking means in the unlocked position.

DESCRIPTION OF THE PREFERRED EMBODIMENT

The positioning device 10 of the present invention is illustrated in FIG. 1 as being fixed at one end 12 to a substantially vertical stationary member 14 of a motor vehicle, such, for example, as a cab-over-engine truck or stand-up delivery type truck. The other end 16 of device 10 is fixed to a conventional steering column 18 having a conventional universal joint 19 for connection to a steering actuation system (not shown). By these connections the axis of the positioning device 10 is caused to make an acute angle with both the horizontal and the axis of the steering column 18. The means for effecting these connections will be described later.

Referring now to FIGS. 2 and 3, the positioning device 10 is illustrated as comprising a primary mounting bracket 20, an outer sleeve member 22, an inner sleeve member 24, antifriction strips 26, a locking device 28, an actuating handle 30, and a steering column clamp assembly 33, and a secondary mounting bracket 32.

Primary mounting bracket 20 is formed of a material of sufficient strength to support the structure as shown in FIG. 1. It is a generally U-shaped member having flat outer mounting flange surfaces 34 having a plurality of holes 36 formed therethrough. Sides 38 extend perpendicularly from this surface, being separated from each other by a distance slightly greater than the width W (as shown in FIG. 3) of the outer sleeve member 22. These sides together with a bridge member 40, form a U-shaped cradle receiving the outer sleeve member 22 in FIG. 2. The mounting flange 34 is joined to the vehicle member 14 by inserting suitable fasteners such as bolts 44 through the holes 36 to engage the vehicle member 14. The sides 38 are joined to the outer sides 46 of the outer sleeve member 22 through welding or like process.

The outer sleeve member 22 comprises a hollow beam of substantially rectangular cross section. In the positioning device the outer sleeve member 22 is assembled in the attitude shown in FIG. 2. It is fixed to the primary mounting bracket 20 and similarly joined by welding or the like to the secondary mounting bracket 32, which is in turn joined to another stationary vehicle member 48 to prevent an excessive overhung moment acting at mounting flange surface 36.

The inner sleeve member 24 also comprises a hollow beam of substantially rectangular cross section, the outer cross-sectional dimensions being somewhat less than the inner cross-sectional dimensions of the outer sleeve member 22, in which it is slideably received. Antifriction strips 26 are disposed in the space between the two sleeve members to facilitate the sliding contact between them. They are preferably formed from teflon and are bonded to the inner surfaces of the outer sleeve member 22 by use of an epoxy-type glue. Other material and bonding selections are possible, however, and the strip may also be bonded to the outer surfaces of the inner sleeve member 24.

The free or outer end 50 of the inner sleeve member 24 is cut to form a predetermined angle with the axis of said sleeve members.

Steering column clamp assembly 33 includes a mounting bracket 34, suitably formed with a substantially semicylindrical inner surface to abut the steering column 18. Bracket 34 is joined to the end 50 of inner sleeve member 24 by welding or the like. Assembly 33 further includes a complementary bracket 52, and fasteners 54. Fasteners 54 secure bracket 34, to bracket 52 to clampingly engage steering column 18.

Two sets of aligned holes 56 and 58 are formed through the top wall 60 and the bottom wall 62 of the outer sleeve member 22 as is shown in phantom in FIG. 2. Slots 64 and 66, substantially greater in axial length than the distance between the sets of holes 56 and 58, are formed through the corresponding walls of the inner sleeve member 24. They register with the holes 56 and 58 to allow insertion of threaded fasteners 68 through the inner and outer sleeve members 22 and 24 to threadably engage blind bores 70 formed in a trunnion housing 72. Spacers 69 slightly greater in length than the length L of outer sleeve member 22 shown in FIG. 3 enclose the shank portion of the fasteners 68 and abut the head of the fastener 68 and the trunnion housing 70 to take up axial load at assembly.

The trunnion housing 72 comprises a generally rectangular flange portion 74 and two generally triangular shaped sides 76 (one side shown) having a set of aligned trunnion holes 78 formed therethrough. A shaft 80 is journalled in trunnion holes 78. One end of handle 30 is fixed by welding or the like to shaft 80.

Prior to insertion of the shaft 80 through the holes 78 a cam member 82 having a central hole 84, is inserted into the space between the sides 76 of the housing 72. The holes are then aligned and the shaft 80 is then inserted through aligned holes 78, 84, 78. The radial position of the cam member 82 with respect to the shaft 80 is fixed by suitable locking means such as a pin 86 as shown in FIGS. 4 and 5.

The cam member 82 is a generally box shaped member of substantially rectangular cross section perpendicular to the axis of the through hole 84, as may best be seen in FIGS. 4 and 5. A generous radius is formed on the side surface 88 adjacent the outer sleeve member 22. This allows movement of the cam member 82 from a locked position (shown in FIG. 4) to an unlocked position (shown in FIG. 5). In the locked position of FIG. 4, the outer sleeve member 22 is deflected to urge the inner sleeve member 24 against the inner surface of the outer sleeve member 22, applying a normal force to the antifriction strips 26 and locking the sleeve members together. In the unlocked position of FIG. 5, there is no contact between the cam member 82 and the outer sleeve member 22.

The assembly described allows selective movement of steering column 18 in a direction parallel to the axis of the positioning device 10. Of course, loading of the inner sleeve member 24 could be facilitated by providing a slot (not shown) in the outer sleeve member 22 registering with the cam 84. Inner and outer sleeve members 24 and 22 move freely in sliding engagement by the reduction in sliding friction afforded by the installation of antifriction strips 26 between them when the locking device 28 is in the unlocked position shown in FIG. 5. Upon reaching a position satisfactory to the operator, further movement is prevented by pulling the handle 30 clockwise as shown in FIG. 1 to move the locking device 28 to the locked position shown in FIG. 4.

The provision of a simple, inexpensive locking arrangement is made possible by the use of the teflon strips 26 which provide a large antifriction bearing surface capable of supporting without permanent deformation high locking forces generated by that locking arrangement normal to the direction of sliding movement.

Other advantages of this novel construction will be apparent to those skilled in the art of adjustable steering columns.

What is claimed is:

1. In a positioning device for an adjustably mounted steering column of a motor vehicle, the positioning device including a stationary sleeve member inclined at a fixed acute angle to the axis of the steering column and a moveable sleeve member telescopically mounted relative to the stationary sleeve member and fixed to the steering column, the improvement comprising:
   antifriction means disposed between said sleeve members for reducing sliding friction therebetween; and
   means for locking said sleeve members in infinitely variable fixed axial relationship, said locking means comprising a cam member mounted on the stationary sleeve member for rotation about an axis normal to the axis of said sleeve members between
   1. a first position in which said cam member operatively engages one of said sleeve members to apply a force in a direction normal to the axis of said sleeve members passing through said antifriction means thereby urging said sleeve members together, and
   2. a second position in which said cam member is operatively disengaged from said one sleeve member.

2. The improvement as defined in claim 1 wherein
   1. said antifriction means comprises one or more strips formed from a smooth, resilient material and
   2. said one or more strips are disposed in the space formed between the inner perimeter of the outer sleeve member and the outer perimeter of the inner sleeve member and extend generally parallel to said sleeve member axis.

3. The improvement as defined in claim 1 wherein said locking means further comprises:
   a longitudinal slot formed through one side of the stationary sleeve member; means mounting said cam member on said one side of said stationary sleeve member for rotation about an axis normal to the axis of said sleeve members between
   1. a first position inserted through said slot and operatively engaging the moveable sleeve member, and
   2. a second position operatively disengaged from said moveable sleeve member.

4. The improvement as defined in claim 1 wherein said locking means further comprises:
   means mounting said cam member on the stationary sleeve member for rotation about an axis normal to the axis of said sleeve members between
   1. a first position in which said cam member operatively engages said stationary sleeve member and deflects said stationary sleeve member in a direction normal to the axis thereof to urge said sleeve members together, and
   2. a second position in which said cam member is operatively disengaged from said stationary sleeve member.

* * * * *

UNITED STATES PATENT OFFICE
CERTIFICATE OF CORRECTION

Patent No. 3,955,439   Dated May 11, 1976

Inventor(s) Lawrence L. Mayer

It is certified that error appears in the above-identified patent and that said Letters Patent are hereby corrected as shown below:

Column 4, line 18, claim 1: before "force" insert

-- force creating a resultant --.

Signed and Sealed this

Tenth Day of August 1976

[SEAL]

Attest:

RUTH C. MASON
Attesting Officer

C. MARSHALL DANN
Commissioner of Patents and Trademarks